United States Patent
Ying (10) Patent No.: US 8,876,320 B2
(45) Date of Patent: Nov. 4, 2014

(54) DIRECT TYPE BACKLIGHT

(75) Inventor: Wentao Ying, Beijing (CN)

(73) Assignees: Boe Technology Group Co., Ltd., Beijing (CN); Suzhou Boe Chatani Electronics Co., Ltd., Suzhou (CN)

( * ) Notice: Subject to any disclaimer, the term of this patent is extended or adjusted under 35 U.S.C. 154(b) by 286 days.

(21) Appl. No.: 13/424,503

(22) Filed: Mar. 20, 2012

(65) Prior Publication Data

US 2012/0243208 A1 Sep. 27, 2012

(30) Foreign Application Priority Data

Mar. 25, 2011 (CN) .......................... 2011 1 0074408

(51) Int. Cl.
G02F 1/1335 (2006.01)

(52) U.S. Cl.
CPC .... *G02F 1/133603* (2013.01); *G02F 1/133611* (2013.01); *G02F 1/133605* (2013.01)
USPC ........................................... 362/97.3; 349/64

(58) Field of Classification Search
USPC ........................................... 362/97.3; 349/64
See application file for complete search history.

(56) References Cited

U.S. PATENT DOCUMENTS

| | | |
|---|---|---|
| 2006/0033859 A1 | 2/2006 | Yun |
| 2007/0081323 A1 | 4/2007 | Yun et al. |
| 2007/0103908 A1* | 5/2007 | Tabito et al. ................. 362/294 |
| 2007/0165154 A1* | 7/2007 | Whitney et al. ................ 349/61 |
| 2008/0117630 A1* | 5/2008 | Durvasula et al. ............ 362/246 |
| 2008/0192174 A1 | 8/2008 | Odake et al. |
| 2008/0225512 A1 | 9/2008 | Roberts et al. |
| 2009/0003002 A1 | 1/2009 | Sato |
| 2010/0066946 A1* | 3/2010 | Song et al. ...................... 349/64 |
| 2011/0025947 A1 | 2/2011 | Thompson et al. |
| 2011/0037922 A1* | 2/2011 | O'Neill et al. .................. 349/62 |
| 2011/0050556 A1 | 3/2011 | Bae et al. |
| 2011/0304796 A1* | 12/2011 | Lee et al. ........................ 349/62 |

FOREIGN PATENT DOCUMENTS

| | | |
|---|---|---|
| CN | 1839340 A | 9/2006 |
| CN | 101253444 A | 8/2008 |
| CN | 101375095 A | 2/2009 |
| JP | 2000-171614 A | 6/2000 |
| JP | 2001-351424 A | 12/2001 |
| JP | 2003-222864 A | 8/2003 |
| KR | 20040031858 A | 4/2004 |
| KR | 100703094 B1 | 3/2007 |

OTHER PUBLICATIONS

Chinese Office Action dated Jul. 29, 2013, Appln. No. 201110074408.
KIPO Office Action dated Jun. 27, 2013, Appln. No. 10-2012-0028815.

(Continued)

*Primary Examiner* — Laura Tso
(74) *Attorney, Agent, or Firm* — Ladas & Parry LLP (57) ABSTRACT

A direct type backlight is provided in the disclosure and comprises: light emitting bodies; a reflecting sheet disposed below the light emitting bodies; a back plate disposed below the reflecting sheet; and a diffusing plate disposed above the light emitting bodies, wherein the backlight further comprises a reflection-enhancing layer disposed between the diffusing plate and the light emitting bodies, and the transflective layer has, on a side thereof facing the light emitting bodies, a reflectivity that is greater than a reflectivity of the diffusing plate and smaller than 1.

7 Claims, 6 Drawing Sheets

(56) References Cited

OTHER PUBLICATIONS

Second Chinese Office Action dated Apr. 8, 2014; Appln. No. 201110074408.X.

Korea Office Action Rejection Decision dated Dec. 19, 2013; Appln. No. 10-2012-0028815.

Third Chinese Office Action dated Aug. 20, 2014; Appln. No. 20111007448.X.

* cited by examiner

DIRECT TYPE BACKLIGHT

BACKGROUND

The present disclosure relates to a direct type backlight.

At present, in the Flat Panel Display (FPD) technology, as liquid crystal displays (LCDs) have such advantages as being light, thin, short and small, as well as greatly saving the space for placing them, they have been gradually replacing cathode ray tube (CRT) displays to become the mainstream of displays. Because a LCD panel does not emit light itself, it is necessary to provide a light emitting source on the LCD panel so that the LCD can display image. Thus, a backlight is indispensable for a LCD.

In the related art, according to positions of backlights in LCDs, the backlights can be categorized into two types, i.e. side-light type backlights and direct type backlights, wherein a side-light type backlight is positioned at a side of a display screen of a LCD, whereas a direct type backlight is positioned direct under a display screen of a LCD. As for a side-light type backlight, light from a bar-like light emitting source are converted into surface light source mainly by a light guide plate.

Figure 1:
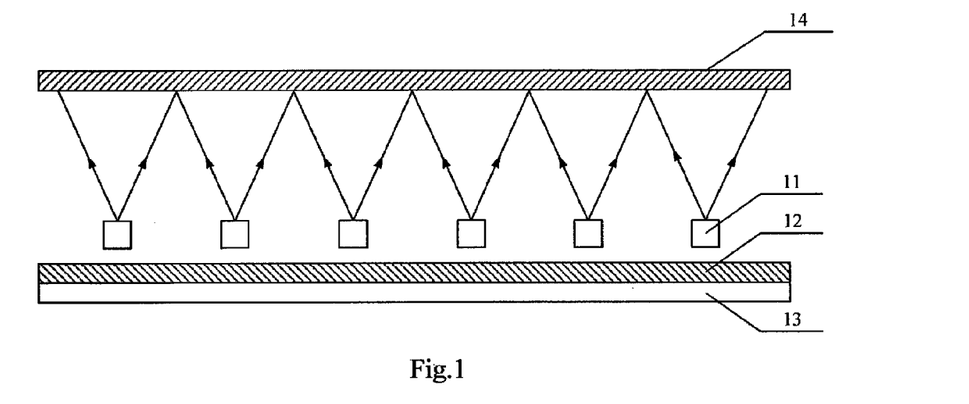
FIG. 1 is a schematic view of a cross-section structure of a direct type backlight in the related art.

As shown in FIG. 1, which is a schematic view of a cross-section structure of a direct type backlight in the related art, the direct type backlight comprises several light emitting bodies 11 arranged in parallel, a reflecting sheet 12, a back plate 13, and a diffusing plate 14, wherein the back plate 13 has a supporting function, a distance between the light emitting bodies 11 and the diffusing plate 14 is called a light mixing distance, and after passing through the light mixing distance, the light emitted from the light emitting bodies 11 reaches the diffusing plate 14, which diffuses the light to form a surface light source that can be output.

Figure 2:
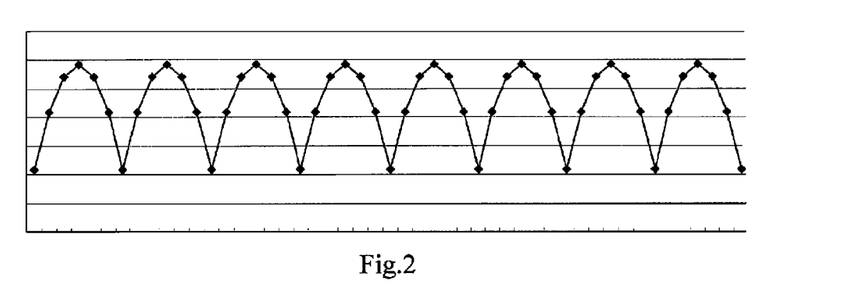
FIG. 2 is a schematic view of the brightness distribution of the light projected onto a LCD panel by the direct type backlight in the related art.

When the light emitting bodies 11 are light emitting diodes (LEDs), the brightness in the center of the light emitting body 11 is relatively high, whereas the brightness at edges is relatively low. Thus, if the distance between the light emitting bodies 11 and the diffusing plate 14 is too close, there might be multiple bright lines or bright spots when the LCD panel is illuminated with the direct type backlight, causing a non-uniform light distribution on the LCD panel, and affecting image quality of the LCD panel severely. FIG. 2 shows a schematic view of the brightness distribution of the light projected onto the LCD panel for the direct type backlight in the related art. In FIG. 2, the horizontal axis represents the abscissa value of the light projected onto the LCD panel, and the vertical axis represents the brightness value of the light. As can be seen in FIG. 2, the distribution of the light projected onto the LCD panel by the direct type backlight is not uniform.

In view of the above problem, it is proposed in the related art to increase the light mixing distance between the light emitting bodies 11 and the diffusing plate 14 to ensure a uniform distribution of the light on the LCD panel. However, this approach makes the thickness of the direct type backlight too thick, and thus makes the thickness of the entire LCD too thick, which is totally against the current need for a light-weighted and thin liquid-crystal display.

SUMMARY

An embodiment of the present disclosure provides a direct type backlight which addresses the problem that the existing direct type backlights are overly thick.

According to an embodiment of the disclosure, a direct type backlight comprises: light emitting bodies; a reflecting sheet disposed below the light emitting bodies; a back plate disposed below the reflecting sheet; and a diffusing plate disposed above the light emitting bodies, wherein the backlight further comprises a reflection-enhancing layer disposed between the diffusing plate and the light emitting bodies, and the transflective layer has, on a side thereof facing the light emitting bodies, a reflectivity that is greater than a reflectivity of the diffusing plate and smaller than 1.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein.

DETAILED DESCRIPTION

Main implementation principals, specific implementations, and the corresponding advantageous effects of the embodiments according to the present disclosure will be described in details with reference to the accompanying drawings below.

In general, embodiments of the present disclosure provide a direct type backlight which comprises light emitting bodies, a reflecting sheet disposed below the light emitting bodies, a back plate disposed below the reflecting sheet and a diffusing plate disposed above the light emitting plate. The backlight further comprises a reflection-enhancing layer having, on a side facing the light emitting bodies, a reflectivity greater than that of the diffusing plate and smaller than.

As the reflectivity of the reflection-enhancing layer on its side facing the light emitting bodies is greater than the reflectivity of the diffusing plate and smaller than 1, the direct type backlight of the embodiments of the present disclosure can cause the light emitted from the light emitting bodies to be reflected multiple times in a cavity formed by the reflecting sheet and the reflection-enhancing layer, so that the purpose of sufficiently mixing the light is fulfilled. This is equivalent to increasing an action distance of the light between the diffusing plate and the light emitting bodies, and thus allows reduction of a light mixing distance, which is a distance between the diffusing plate and the light emitting bodies and is also referred as the thickness of the direct type backlight, thereby allowing reduction of the thickness of the entire LCD.

Embodiment 1

Embodiment 1 of the present disclosure provides a direct type backlight, in which a transflective layer with a reflectivity greater than 0 and smaller than 1 is provided between a diffusing sheet and light emitting bodies. Part of the light emitted from the light emitting bodies are reflected multiple times in a cavity formed by the transflective layer and a reflecting sheet, so as to be mixed sufficiently. This is equivalent to increasing an action distance of the light between the diffusing plate and the light emitting bodies for the light, thereby reducing the thickness of the direct type backlight and thus the thickness of the entire LCD.

Figure 3:
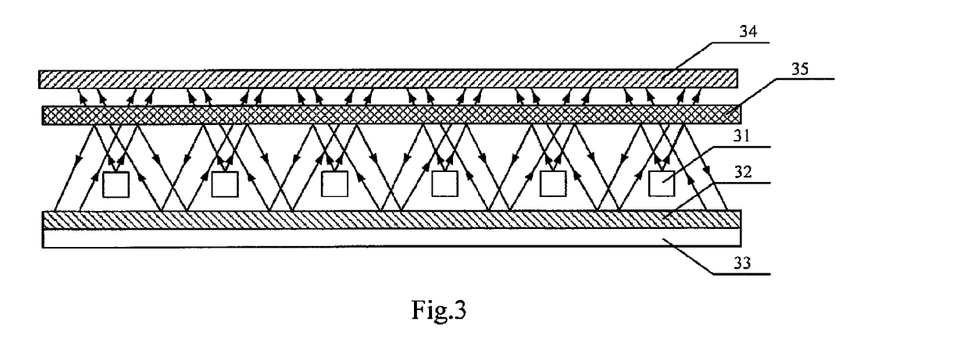
FIG. 3 is a schematic view of a cross-section structure of a direct type backlight according Embodiment 1 of the present disclosure.

As shown in FIG. 3, which is a schematic view of a cross-section structure of the direct type backlight provided in Embodiment 1 of the present disclosure, the backlight comprises several light emitting bodies 31 arranged in parallel, a reflecting sheet 32 disposed below the light emitting bodies 31, a back plate 33 disposed below the reflecting sheet 32, a diffusing plate 34 disposed above the light emitting bodies 31, and a transflective layer 35, wherein the transflective layer 35 is disposed between the diffusing plate 34 and the light emitting bodies 31, and the reflectivity of the transflective layer 35 is greater than 0 and smaller than 1.

The sum of the reflectivity and the transmissivity of the transflective layer 35 is 1, wherein the reflectivity of the transflective layer is represented by V1, and the transmissivity thereof is represented by V2, then V1+V2=1. Because 0<V1<1, then 0<V2<1. That is, after reaching the transflective layer 35, some of the light is reflected, and the other of the light is transmitted.

After reaching the transflective layer 35, some of the light emitted from the light emitting bodies 31 is reflected, while the other of the light is transmitted. The light transmitted then exits after being diffused by the diffusing plate 34, and the light reflected is reflected by the reflecting sheet 32 and then reaches the transflective layer 35 again, such that some of the light emitted from the light emitting bodies 31 is reflected multiple times inside the cavity formed by the transflective layer 35 and the reflecting sheet 32, and the purpose of sufficiently mixing the light is fulfilled. This is equivalent to increasing the action distance of the light between the diffusing plate 34 and the light emitting bodies 31, and thus reduces the distance between the diffusing plate 34 and the light emitting bodies 31 (i.e., the light mixing distance of the direct type backlight) effectively while ensuring display quality of the LCD, thereby reducing the thickness of the direct type backlight and thus the thickness of the entire LCD.

Figure 4:
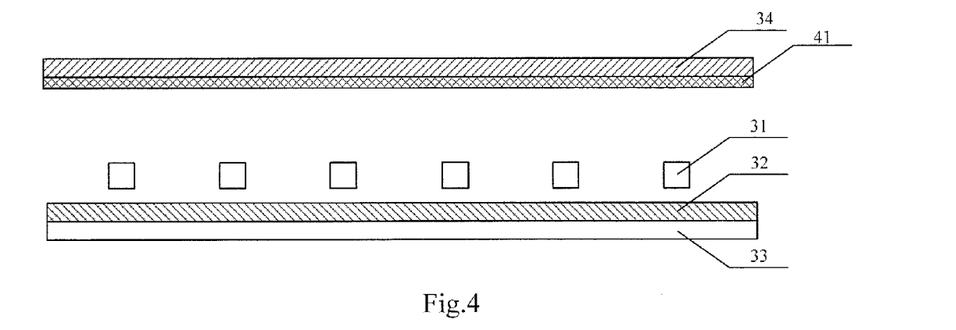
FIG. 4 is a schematic view 1 of a cross-section structure of a first implementation of a direct type backlight according to Embodiment 1 of the present disclosure.

The configuration of the transflective layer 35 can be carried out with but not limited to the following 7 implementations:

In the first implementation, as shown in FIG. 4, the transflective layer 35 is a surface coating 41 coated on a lower surface of the diffusing plate 34, and the surface coating 41 is coated on the entire lower surface of the diffusing plate 34. The reflectivity of the surface coating 41 is greater than 0 and smaller than 1, and the material of the surface coating 41 can be but not limited to resin material.

Figure 5:
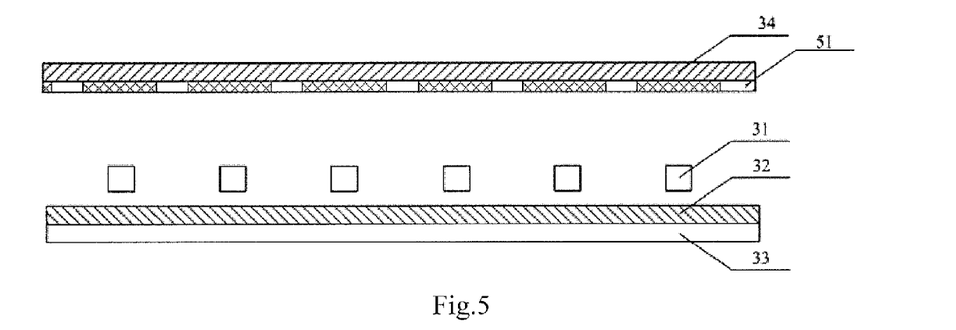
FIG. 5 is a schematic view of a cross-section structure of a second implementation of a direct type backlight according to Embodiment 1 of the present disclosure.

In the second implementation, as shown in FIG. 5, the transflective layer 35 is a surface coating 51 coated on the lower surface of the diffusing plate 34, and the surface coating 51 is coated on parts of the lower surface of the diffusing plate 34. The reflectivity of the surface coating 51 is greater than 0 and smaller than 1. Some of the light emitted from the light emitting bodies 31 exits after reaching the diffusing plate 34, and the other of the light is divided into two parts again after reaching the surface coating 51, in which one part is reflected toward the reflecting sheet 32, and the other is transmitted to the diffusing plate 34 and output after being diffused by the diffusing plate 34.

Figure 6:
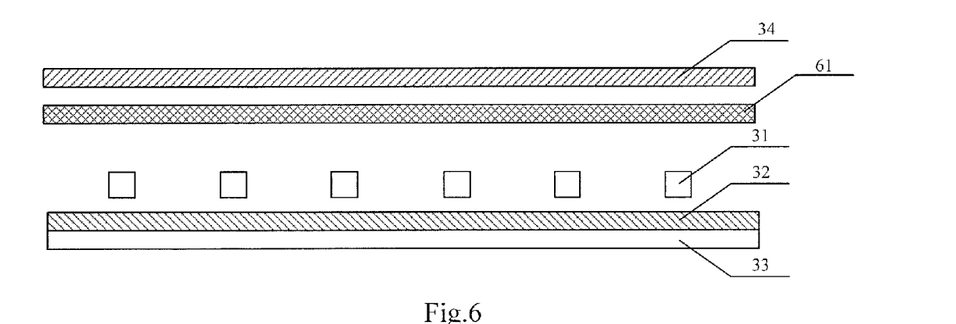
FIG. 6 is a schematic view of a cross-section structure of a third implementation of a direct type backlight according to Embodiment 1 of the present disclosure.
Figure 7:
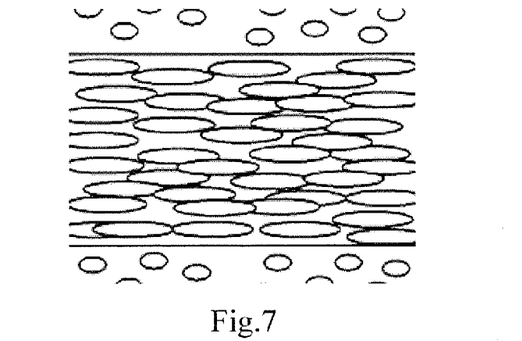
FIG. 7 is a schematic view of material microstructure of a sheet capable of only reflecting after being cut.
Figure 8:
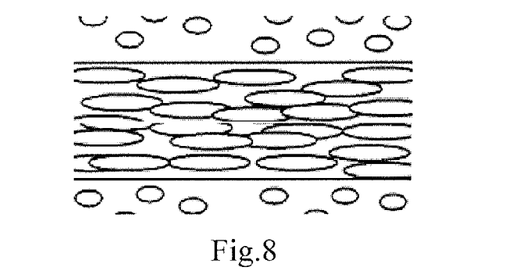
FIG. 8 is a schematic view of material microstructure of a transflective sheet after being cut, wherein the transflective sheet is capable of both transmitting and reflecting and can be used in Embodiment 1 of the present disclosure.

In the third implementation, as shown in FIG. 6, the transflective layer 35 can be a light transmitting body 61 having a reflectivity of greater than 0 and smaller than 1, i.e., having both the capabilities of reflecting and of transmitting, such as a transflective sheet made of polyethylene terephthalate (PET). In order to allow some of the light to be transmitted, the thickness of the transflective sheet can be reduced properly, that is to reduce the thickness of a bubble layer, so as to allow some of the light that are not reflected to be transmitted into the diffusing plate 34. A material microstructure of the transflective sheet having only the capability of reflecting is shown in FIG. 7 with the sheet being cut, and a material microstructure of the transflective sheet having both the capabilities of reflecting and of transmitting is shown in FIG. 8 with the sheet being cut.

Also, the transflective sheet can be replaced by a PET film coated with scattering particles on a surface thereof, and the PET film with the scattering particles can provide the capabilities of reflecting and transmitting.

Figure 9:
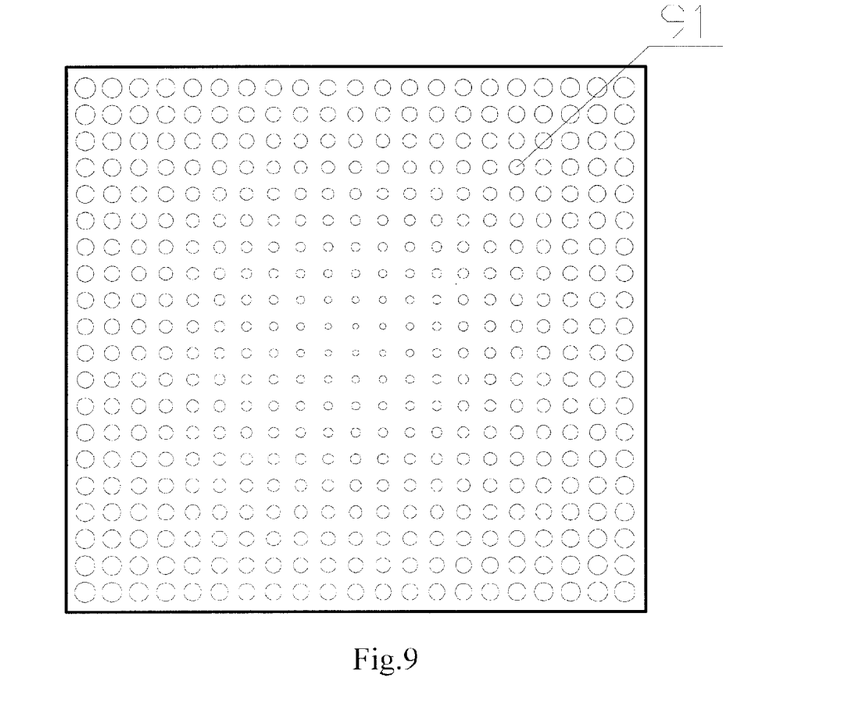
FIG. 9 is a plan view of a transflective unit having light transmitting holes, which can be used in Embodiment 1 of the present disclosure.

In the fourth implementation, the light transmitting body 61 shown in FIG. 6 is provided with a number of light transmitting holes spaced apart and having a cross section of but not limited to a circle, a polygon, or the like. If the portion of the light transmitting body positioned above each light emitting body 31 is regarded as a transflective unit of the entire light transmitting body, then the entire light transmitting body is composed of a plurality of transflective units. FIG. 9 is a plan view of each transflective unit, wherein the center of the transflective unit shown in FIG. 9 is disposed on the vertical axis on which the center of the underlying light emitting body 31 is disposed. Each transflective unit comprises a plurality of light transmitting holes 91, through which some of the light emitted from the light emitting bodies 31 can pass directly to reach the diffusing plate 34, and the rest of the light is transmitted to the diffusing plate 34 or reflected to the reflecting sheet 32 by the light transmitting body 61. Since the light intensity directly above the light emitting bodies 31 is larger, in order to allow the light emitted from the light emitting bodies 31 to be mixed uniformly in the cavity formed by the transflective layer 35 and the reflecting sheet 32, a number of light transmitting holes whose diameters increase gradually from the center toward the edge can be provided on the light transmitting body 61 at the position corresponding to the light emitting body 31. That is, the diameters of the light transmitting holes 91 directly above the light emitting body 31 are made relatively smaller (for example, those circles at the center area in FIG. 9 are made smaller), whereas the diameters of the light transmitting holes 91 provided at the edges are made relatively larger (for example, those circles at the edge area in FIG. 9 are made larger).

Figure 10:
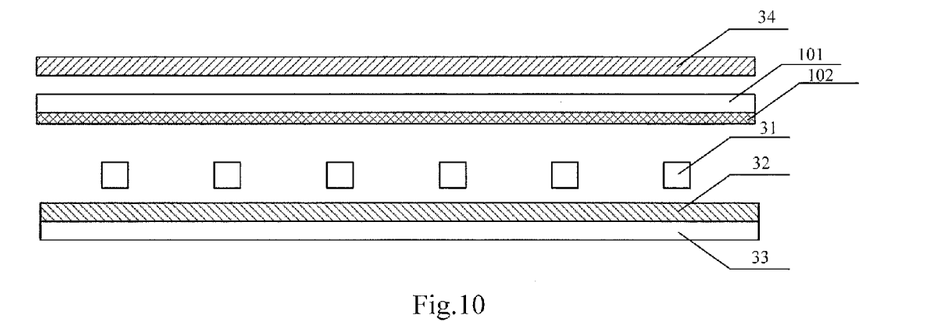
FIG. 10 is a schematic view of a cross-section structure of a fifth implementation of a direct type backlight according to Embodiment 1 of the present disclosure.

In the fifth implementation, as shown in FIG. 10, the transflective layer 35 comprises a substrate 101 provided between the diffusing plate 34 and the light emitting bodies 31, and a surface coating 102 coated on a surface of the substrate 101, and the entire surface of the substrate 101 is coated with the surface coating 102. The reflectivity of the surface coating 102 is greater than 0 and smaller than 1, and the transmissivity of the substrate is greater than 0. The substrate 101 can be of a transparent material, the surface coating 102 can be of but not limited to a resin material, and the surface coating 102 can be coated, without limitation, to the lower surface of the substrate 101.

Figure 11:
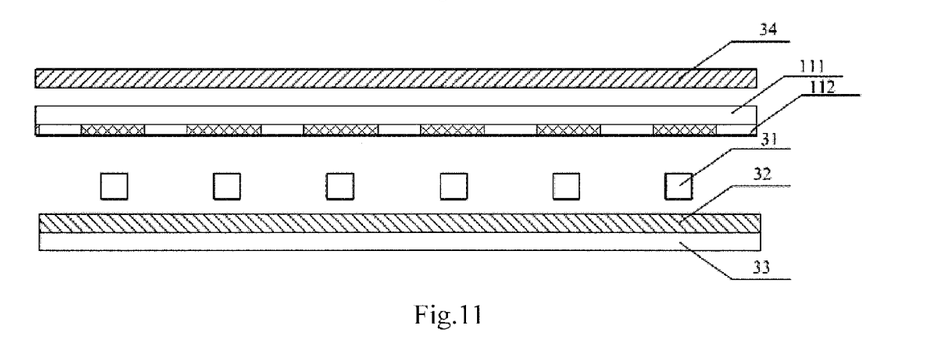
FIG. 11 is a schematic view of a cross-section structure of a sixth implementation of a direct type backlight according to Embodiment 1 of the present disclosure.

In the sixth implementation, as shown in FIG. 11, the transflective layer 35 comprises a substrate 111 provided between the diffusing plate 34 and the light emitting bodies 31, and a surface coating 112 coated on a surface of the substrate 111, and the surface of the substrate 111 is partially coated with the surface coating 112. The reflectivity of the surface coating 112 is greater than 0, and the transmissivity of the substrate 111 is greater than 0. The substrate 111 can be of a transparent material, and the surface coating 112 can be coated, without limitation, to the lower surface of the substrate 111.

Figure 12:
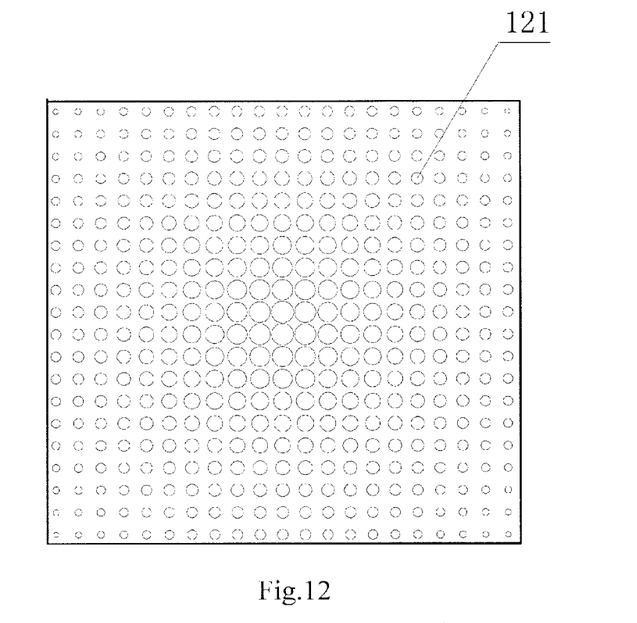
FIG. 12 is a bottom view of a transflective unit having a coating microstructure, which can be used in Embodiment 1 of the present disclosure.

In the sixth implementation described above, the surface coating 112 can comprise a number of coating microstructures spaced apart and having a reflectivity of greater than 0. The shape of each coating microstructure can be but not limited to a circle, a polygon or the like. After reach the coating microstructures, some of the light emitted from the light emitting bodies exit via the coating microstructures, and some of the light is reflected to the reflecting sheet by the coating microstructure, and returns to the gap between the coating microstructures or at the coating microstructure after being reflected by the reflecting sheet. If a portion of the substrate 111 above each light emitting body 31 is regarded as a transflective unit of the entire substrate, then the entire substrate 111 is composed of a plurality of transflective units. FIG. 12 is a bottom view of each transflective unit. The center of the transflective unit shown in FIG. 12 is disposed on the vertical axis on which the center of an underlying light emitting body 31 is disposed. Each coating microstructure 121 is a circle. Since the light intensity directly above the light emitting bodies 31 is larger, in order to allow the light emitted from the light emitting bodies 31 to be mixed uniformly in the cavity formed by the transflective layer 35 and the reflecting sheet 32, a number of coating microstructures 121 can be provided on the substrate at a position corresponding to each light emitting body with the profile areas of the number of the coating microstructures 121 decrease gradually from the center toward the edge. That is, the profile areas of the reflective coating microstructure 121 directly above the light emitting body are made relatively larger (for example, those circles at the center area in FIG. 12 are made larger), whereas the profile areas of the reflective coating microstructure 121 disposed at the edges are made relatively smaller (for example, those circles at the edge area in FIG. 12 are made smaller).

The seventh implementation is to provide the substrate 101 shown in FIG. 10 and the substrate 111 shown in FIG. 11 with a number of light transmitting holes that are spaced apart and have a cross section of, but not limited to, a circle, a polygon, or the like. At this point, if the portion of the substrate above each light emitting body 31 is regarded as a transflective unit of the entire substrate, then the entire substrate is composed of a plurality of transflective units. FIG. 9 is a plan view of each transflective unit. The center of the transflective unit shown in FIG. 9 is disposed on the vertical axis on which the center of the underlying light emitting body 31 is disposed. Each transflective unit comprises a plurality of light transmitting holes 91, through which some of the light emitted from the light emitting bodies 31 can pass directly to reach the diffusing plate 34, and the rest of the light is transmitted to the diffusing plate 34 or reflected to the reflecting sheet 32 by the surface coating coated on the surface of the substrate. Since the light intensity directly above the light emitting bodies 31 is larger, in order to allow the light emitted from the light emitting bodies 31 to be mixed uniformly in the cavity framed by the transflective layer 35 and the reflecting sheet 32, a number of light transmitting holes 91 can be provided on the substrate at the position corresponding to the light emitting body with diameters of the number of the light transmitting holes 91 increase gradually from the center toward the edge. That is, the diameters of the light transmitting holes 91 directly above the light emitting body 31 can be made relatively smaller (for example, those circles at the center area in FIG. 9 are made smaller), whereas the diameters of the light transmitting holes 91 provided at the edges can be made relatively larger (for example, those circles at the edge area in FIG. 9 are made larger).

As for the positional relation between the transflective layer 35 and the diffusing plate 34, Embodiment 1 of the present disclosure proposes in the first implementation described above that since the transflective layer 35 is a surface coating coated on the lower surface of the diffusing plate 34, so the transflective layer 35 and the diffusing plate 34 are provided parallel to each other.

Regarding the second to seventh implementations described above, the transflective layer 35 can be provided so as to form an angle with respect to the diffusing plate 34. Preferably, in order to perform a uniform mixing of the light emitted from the light emitting bodies 31, the transflective layer 35 and the diffusing plate 34 can be provided parallel to each other. Further, the distance between the transflective layer 35 and the diffusing plate 34 can be determined according to the brightness and the divergency of the light emitted from the light emitting bodies 31.

In Embodiment 1 of the present disclosure, the reflectivity of the transflective layer 35 is greater than 0 and smaller than 1. To provide a sufficient mixing of the light emitted from the light emitting bodies 31, the reflectivity of the transflective layer 35 can be increased appropriately. However, if the reflectivity of the transflective layer 35 is too large, it will result in a greater loss of the light during multiple reflections. Therefore, in a specific application, the reflectivity of the transflective layer 35 can be set in accordance with requirements. For example, if the thickness of the direct type backlight is needed to be as small as possible, then the reflectivity of the transflective layer 35 should be set to be relatively larger. On the other hand, if the power loss in the direct type backlight is needed to be as small as possible, then a transflective layer 35 with a higher transmissivity should be adopted.

In the technical solution of Embodiment 1 of the present disclosure, the direct type backlight comprises not only light emitting bodies, a reflecting sheet, a back plate, and a diffusing plate, but also a transflective layer disposed between the diffusing plate and the light emitting bodies, and the reflectivity of the transflective layer is greater than 0 and smaller than 1. After reaching the transflective layer, some of the light emitted from the light emitting bodies is reflected, while some of the light are transmitted and then output after being diffused by the diffusing plate. The reflected light is reflected by the reflecting sheet and then reaches the transflective layer again, so that some of the light emitted from the light emitting bodies is reflected multiple times inside a cavity formed by the transflective layer and the reflecting sheet, thereby achieving the purpose of being mixed sufficiently. This is equivalent to increasing the action distance of the light between the diffusing plate and the light emitting bodies, and thus allows reduction of a light mixing distance, which is a distance between the diffusing plate and the light emitting bodies, so that it is possible to reduce the thickness of the direct type backlight and thus the thickness of the entire LCD.

Embodiment 2

Figure 13:
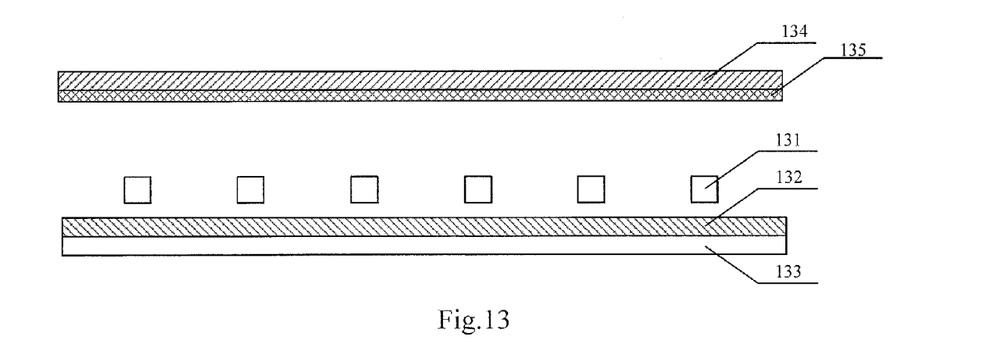
FIG. 13 is a schematic view of a cross-section structure of a direct type backlight according to Embodiment 2 of the present disclosure.

As shown in FIG. 13, which is a schematic view of a cross-section structure of the direct type backlight according to Embodiment 2 of the present disclosure, the backlight comprises several light emitting bodies 131 arranged in parallel, a reflecting sheet 132 disposed below the light emitting bodies 131, a back plate 133 disposed below the reflecting sheet 132, and a diffusing plate 134 disposed above the light emitting bodies 131. The backlight further comprises a surface coating 135 coated on the lower surface of the diffusing plate 134. The lower surface of the diffusing plate 134 is partially coated with the surface coating 135, and the surface coating 135 has a number of coating microstructures that are spaced apart and each have a reflectivity of 1.

Some of the light emitted from the light emitting bodies 131 reaches the diffusing plate 134 and then exits after being diffused by the diffusing plate 134, and the other of the light reaches the coating microstructure in the surface coating 135 and then is reflected to the reflecting sheet 132, and then returns to the diffusing plate 134 or the coating microstructure after being reflected by the reflecting sheet 132, such that some of the light emitted from the light emitting bodies 131 is reflected multiple times in a cavity formed by the diffusing plate 134 and the reflecting sheet 132, so as to be sufficiently mixed.

The shape of each coating microstructure can be, but not limited to, a circle, a polygon, or the like. At this point, if the portion of the diffusing plate above each light emitting body 31 is regarded as a transflective unit of the entire diffusing plate, then the entire diffusing plate is composed of a plurality of transflective units. FIG. 12 is a bottom view of each transflective unit. The center of the transflective unit shown in FIG. 12 is disposed on the vertical axis on which the center of the underlying light emitting body 31 is disposed. Each coating microstructure 121 can be, but not limited to, a circle. Since the light intensity directly above the light emitting bodies 131 is larger, in order to allow the light emitted from the light emitting bodies 131 to be mixed uniformly in the cavity fanned by the diffusing plate 134 and the reflecting sheet 132, a number of coating microstructures 121 can be provided on the diffusing plate 134 at the position corresponding to the light emitting body 131 with the profile areas of the number of coating microstructures 121 decrease gradually from the center toward the edge. That is, the profile areas of the reflective coating microstructures 121 directly above the light emitting body 131 are made relatively larger (for example, those circles at the center area in FIG. 12 are made larger), whereas the profile areas of the reflective coating microstructure 121 disposed at the edges are made relatively smaller (for example, those circles disposed at the edge area in FIG. 12 are made smaller).

In the technical solution of Embodiment 2 of the present disclosure, the direct type backlight comprises not only light emitting bodies, a reflecting sheet, a back plate, and a diffusing plate, but also a surface coating coated on the lower surface of the diffusing plate, wherein the surface coating comprises coating microstructures which are spaced apart and each have a reflectivity of 1. Therefore, some of the light emitted from the light emitting bodies reaches the coating microstructures, and some of the light directly reaches the diffusing plate. The light reaching the diffusing plate exits after being diffused by the diffusing plate, and the light reaching the coating microstructures will be reflected onto the reflecting sheet and returns to gaps between the coating microstructures or to the coating microstructures after being reflected by the reflecting sheet, such that some of the light emitted from the light emitting bodies is reflected multiple times inside a cavity formed by the diffusing plate and the reflecting sheet, so as to be mixed sufficiently. This is equivalent to increasing the action distance of the light between the diffusing plate and the light emitting bodies, and thus allows reduction of a light mixing distance, which is a distance between the diffusing plate and the light emitting bodies, so that it is possible to reduce the thickness of the direct type backlight and thus the thickness of the entire LCD.

In the embodiments of the present disclosure, the light emitting body can be an LED or a cold cathode fluorescent lamp (CCFL).

As the direct type backlight according to the embodiments of the present disclosure mixes the light sufficiently, compared with an existing direct type backlight, the direct type backlight according to the embodiments of the present disclosure can have a thickness reduced by about 40-50%. For achieving the same light mixing effect, if the light mixing distance of the direct type backlight in the related art is 20 mm, the light mixing distance of the direct type backlight provided in the embodiments of the present disclosure can be 12 mm.

Figure 14:
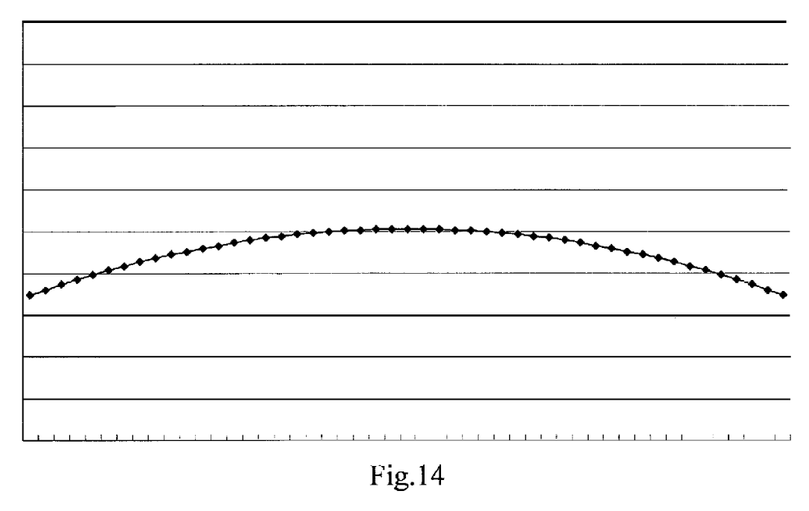
FIG. 14 is a schematic view of the brightness distribution of the light projected onto a LCD panel by a direct type backlight according to an embodiment of the present disclosure.

FIG. 14 shows a schematic view of the brightness distribution of the light projected onto an LCD panel by a direct type backlight according to the embodiments of the present disclosure, with the horizontal axis representing the abscissa value of the light projected onto the LCD panel, and the vertical axis representing the brightness value of the light. As can be seen in FIG. 14, the distribution of the light projected onto the LCD panel by the direct type backlight according to the embodiments of the present disclosure is relatively uniform.

The technology of the present disclosure being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. A direct type backlight, comprising:
light emitting bodies;
a reflecting sheet disposed below the light emitting bodies;
a back plate disposed below the reflecting sheet; and
a diffusing plate disposed above the light emitting bodies, wherein the backlight further comprises a reflection-enhancing layer disposed between the diffusing plate and the light emitting bodies, and the reflection-enhancing layer has, on a side thereof facing the light emitting bodies, a reflectivity that is greater than a reflectivity of the diffusing plate and smaller than 1, wherein the reflection-enhancing layer is a transflective layer, wherein the transflective layer comprises a substrate having a transmissivity of greater than 0 and a surface coating partially coated on a surface of the substrate, and the reflectivity of the surface coating is greater than 0; and wherein the surface coating comprises coating microstructures that are spaced apart, and after the light emitted from the light emitting bodies reaches the coating microstructures, some of the light exits through the coating microstructures, and some of the light is reflected to the reflecting sheet by the coating microstructures.

2. The direct type backlight according to claim 1, wherein the transflective layer is a transflective sheet made from polyethylene terephthalate.

3. The direct type backlight according to claim 1, wherein the transflective layer is a polyethylene terephthalate film applied with scattering particles on a surface thereof.

4. The direct type backlight according to claim 1, wherein the surface of the substrate is composed of a plurality of transflective units, each transflective unit is corresponding to one of the light emitting bodies and is provided with a number of coating microstructures, and profile areas of the number of coating microstructures decrease gradually from the center toward the edge.

5. The direct type backlight according to claim 1, wherein the transflective layer and the diffusing plate are arranged in parallel.

6. A direct type backlight, comprising:
light emitting bodies;
a reflecting sheet disposed below the light emitting bodies;
a back plate disposed below the reflecting sheet; and
a diffusing plate disposed above the light emitting bodies,
wherein the backlight further comprises a reflection-enhancing layer disposed between the diffusing plate and the light emitting bodies, and the reflection-enhancing layer has, on a side thereof facing the light emitting bodies, a reflectivity that is greater than a reflectivity of the diffusing plate and smaller than 1,
wherein the reflection-enhancing layer is a surface coating coated on a lower surface of the diffusing plate, the surface coating has coating microstructures which are spaced apart and each have a reflectivity of 1, and after reaching the coating microstructures, the light emitted from the light emitting bodies is reflected to the reflecting sheet and then the light reflected by the reflecting sheet exits through gaps between the coating microstructures.

7. The direct type backlight according to claim 6, wherein the diffusing plate is composed of a plurality of transflective units, each transflective unit is corresponding to one of the light emitting bodies and comprises a number of the coating microstructures, and profile area of the number of coating microstructures decrease gradually from the center toward the edge.

* * * * *